US012606299B2

(12) United States Patent
Mornacchi et al.

(10) Patent No.: US 12,606,299 B2
(45) Date of Patent: Apr. 21, 2026

(54) TAIL ROTOR BEARING CONDITION MONITORING

(71) Applicant: Microtecnica S.r.l., Turin (IT)

(72) Inventors: Andrea Mornacchi, Turin (IT); Enrico Quaglia, Chieri (IT)

(73) Assignee: MICROTECNICA S.R.L., Turin (IT)

( * ) Notice: Subject to any disclaimer, the term of this patent is extended or adjusted under 35 U.S.C. 154(b) by 389 days.

(21) Appl. No.: 18/205,084

(22) Filed: Jun. 2, 2023

(65) Prior Publication Data

US 2023/0406491 A1 Dec. 21, 2023

(30) Foreign Application Priority Data

Jun. 17, 2022 (EP) ..................................... 22425026

(51) Int. Cl.
| | |
|---|---|
| *B64C 27/78* | (2006.01) |
| *B64C 27/605* | (2006.01) |
| *B64D 45/00* | (2006.01) |
| *G01L 3/14* | (2006.01) |
| *G01L 5/00* | (2006.01) |
| *G01M 13/04* | (2019.01) |
| *F16C 19/52* | (2006.01) |

(52) U.S. Cl.
CPC ............ *B64C 27/78* (2013.01); *B64C 27/605* (2013.01); *B64D 45/00* (2013.01); *G01L 3/1435* (2013.01); *G01L 5/009* (2013.01); *G01M 13/04* (2013.01); *B64D 2045/0085* (2013.01); *F16C 19/522* (2013.01); *F16D 2300/18* (2013.01)

(58) Field of Classification Search
CPC ..... B64C 27/178; B64C 27/605; B64C 27/04; B64C 27/54; B64D 45/00; B64D 2045/0085; G01L 3/1435; G01L 5/009; G01M 13/04; F16C 19/522; F16D 2300/18

See application file for complete search history.

(56) References Cited

U.S. PATENT DOCUMENTS

| | | | |
|---|---|---|---|
| 3,783,682 A | 1/1974 | Lipari | |
| 10,259,572 B2 | 4/2019 | Hale et al. | |
| 2017/0276183 A1* | 9/2017 | Davies | F16D 41/02 |
| 2023/0101756 A1* | 3/2023 | Tukaram Shinde .. | F16D 41/067 464/30 |

FOREIGN PATENT DOCUMENTS

| | | | |
|---|---|---|---|
| CN | 101532435 A | * | 9/2009 |
| CN | 104697434 A | * | 6/2015 |

(Continued)

OTHER PUBLICATIONS

European Search Report for Application No. 22425026.6, mailed Nov. 29, 2022, 7 pages.

*Primary Examiner* — Jonathan M Dunlap

(74) *Attorney, Agent, or Firm* — CANTOR COLBURN LLP

(57) ABSTRACT

An assembly for monitoring torque applied to a control rod of an actuator, the control rod mounted within and rotational relative to a housing, the assembly comprising a torsional spring located between the control rod and the housing, and one or more sensors for monitoring angular displacement of the control rod relative to the housing as consequence of torque applied to the control rod transmitted through the torsional spring.

14 Claims, 5 Drawing Sheets

(56)         References Cited

FOREIGN PATENT DOCUMENTS

| CN | 206555382 | U | * | 10/2017 | | |
|----|-----------|---|---|---------|---|---|
| CN | 212205296 | U | * | 12/2020 | | |
| EP | 3753850 | A1 | | 12/2020 | | |
| WO | 2010139350 | A1 | | 12/2010 | | |
| WO | 2021072220 | A1 | | 4/2021 | | |
| WO | WO-2022099256 | A1 | * | 5/2022 | .......... | B25B 23/142 |
| WO | WO-2023183249 | A1 | * | 9/2023 | .......... | A61F 2/9517 |
| WO | WO-2023183253 | A1 | * | 9/2023 | .......... | A61F 2/9517 |

* cited by examiner

TAIL ROTOR BEARING CONDITION MONITORING

CROSS REFERENCE TO RELATED APPLICATION

This application claims priority to European Patent Application No. 22425026.6 filed Jun. 17, 2022, the entire contents of which is incorporated herein by reference.

TECHNICAL FIELD

The present disclosure relates to monitoring the health or condition of a bearing in a tail rotor assembly of a helicopter, to identify imminent seizure or degradation of the bearing.

BACKGROUND

The pitch of the blades of the tail rotors of a helicopter are controlled by a tail rotor control assembly responsive to operation of a pedal or other inceptor in the cockpit. The inceptor is connected to the tail rotor control system by a flexible cable and/or rigid links which is connected to a lever mechanism e.g. via a bellcrank. The lever mechanism forms part of the tail rotor servo actuator. When the pilot actuates the inceptor, this pulls the cable and/or rigid links and the movement is transferred via the bellcrank to the lever mechanism. As the lever moves, it actuates the hydraulic system of the servo actuator via one or more hydraulic valves, both linear and rotary, which causes resultant axial movement of the actuator control rod or piston that moves axially within and relative to an outer hydraulic cylinder. The other end of the control rod is connected to the tail rotor blade assembly. The tail rotor assembly includes a swash plate and a series of linkages connected to the rotor blades. The swash plate is attached to the axially moveable control rod or piston by means of a rotating bearing e.g. a duplex bearing having an inner and outer race, which allows rotation of the swash plate relative to the axially movable control rod. Thus, in response to the pilot command, the control rod moves axially causing axial movement of the plate which, via the linkages, varies the pitch of the blades. The plate will rotate with rotation of the blades but, because of the presence of the bearing, this rotation will not be transferred to the control rod and so, in an ideal scenario, no torque will be transferred to the control rod due to rotation of the rotor assembly—i.e. the tail rotor actuator (TRA) and the tail rotor are rotationally decoupled by the duplex bearing. This is only a brief explanation of the tail rotor assembly as such assemblies are known in the art.

The tail rotor of a helicopter is subject to high forces and rotates at high speeds and the components are subjected to wear. Regular maintenance of the parts of the assembly is essential to ensure reliable operation and safety.

In particular, the bearing may suffer from degradation and can seize. It is important to know the condition of the bearing so that the bearing can be replaced before it degrades or fails to such an extent that it fails to rotationally decouple the rotor and the TRA. If the bearing fails, excessive torque transmitted from the rotor, via the bearing, to the control rod can cause damage to the TRA such that the rotor is no longer responsive to pilot commands. This can have catastrophic consequences.

The current approach to monitoring the condition of the bearing and avoiding such problems is two-fold. First, the TRA is designed to withstand some torque to be transmitted to the control rod, to allow for some small degree of degradation to the bearing without damage to the TRA. Second, the status of the bearing is continuously monitored by means of regular maintenance inspections conducted by qualified personnel. In some helicopters, a temperature sensor located in proximity to the bearing is installed to support the maintenance inspections. as the bearing degrades and begins to seize, frictional forces cause an increase in the temperature of the bearing. Detection of a temperature higher than a predetermined threshold indicative of a concerning level of degradation of the bearing can then trigger an alarm to the maintenance personnel to replace the bearing. As the temperature sensor has to be located close to the bearing and to maintain a set distance from the bearing during operation, positioning of the sensor presents challenges due to the area in which it is located being subject to rotation and axial translation. Typically, therefore, the temperature sensor has to be mounted into a recess in the control rod formed by deep drilling. This is time and cost intensive and has an adverse effect of the integrity of the control rod structure. In addition, since the temperature sensor is not in direct contact with the bearing, the temperature measurement takes place indirectly, therefore the temperature measurement is not very accurate and subject to external influences.

There is, therefore, a need for an improved way of monitoring the condition of a bearing in a tail rotor assembly.

SUMMARY

According to the present disclosure, there is provided an assembly for monitoring torque applied to a control rod of an actuator, the control rod mounted within and rotational relative to a housing, the assembly comprising a torsional spring located between the control rod and the housing, and one or more sensors for monitoring angular displacement of the control rod relative to the housing as consequence of torque applied to the control rod transmitted through the torsional spring.

According to another aspect of the present disclosure, there is provided an actuator assembly comprising: an actuator housing; and an assembly as defined above mounted within the actuator housing, the control rod arranged to move axially within and relative to the actuator housing, the control rod having a first end within the actuator housing and a second end extendible out of the actuator housing when the control rod moves relative to the actuator housing, the torsional spring provided at the first end of the control rod.

The assembly is particularly, but not exclusively, suited to a tail rotor actuator.

BRIEF DESCRIPTION

Examples of the bearing condition monitoring according to the invention will now be described with reference to the drawings. It should be noted that these are examples only and variations are possible within the scope of the claims.

DETAILED DESCRIPTION

Figure 1:
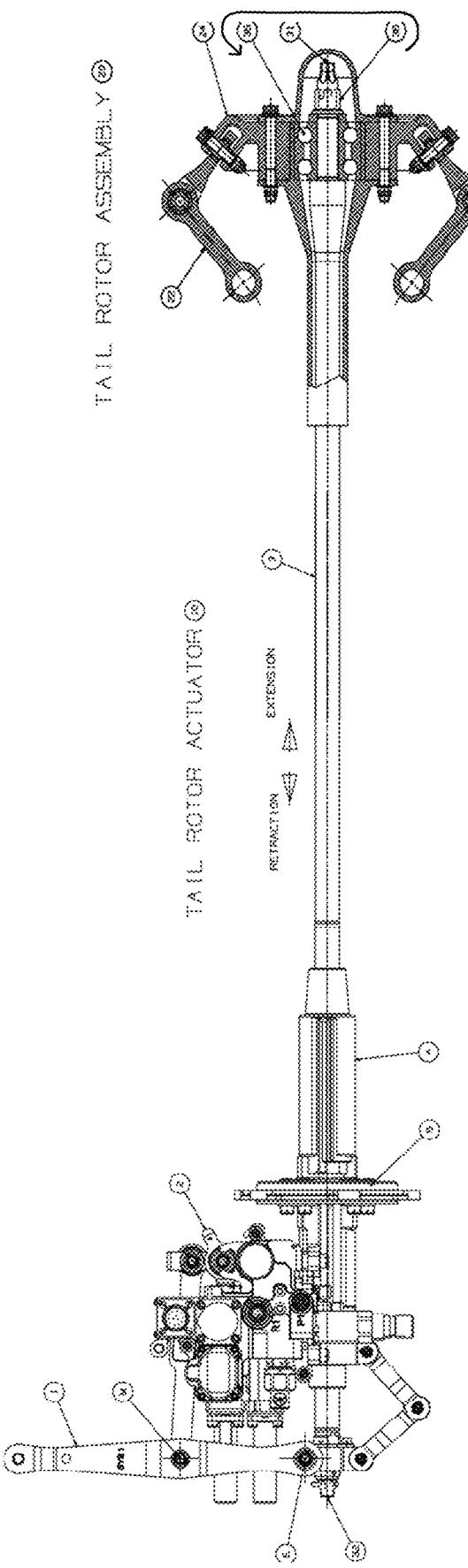
FIG. 1 shows a typical tail rotor control assembly.
Figure 2:
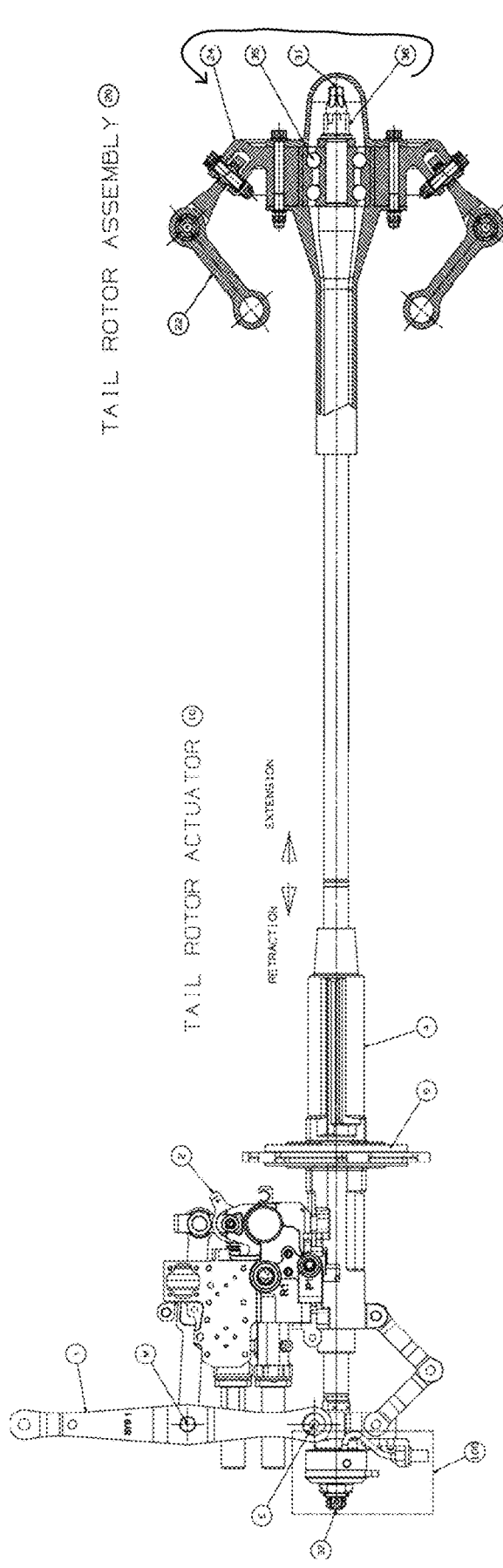
FIG. 2 shows how the tail rotor control assembly can be modified in accordance with the disclosure.

The typical tail rotor control assembly (described above in the Background) will again be briefly described with reference to FIG. 1.

The rotor is controlled by actuation of a pedal or other inceptor (not shown) by the pilot which, via a cable and/or rigid links, causes movement of a lever 1. The middle M of the lever 1 is connected to one or more hydraulic valves, both linear and rotary, located in the servo actuator (tail rotor actuator or TRA) 10, via a layshaft 2 to control axial movement of the control rod or piston 3 of the actuator. An end E of the lever 1 is connected to an end 32 of the control rod 3 so as to provide position feedback. The control rod 3 is able to move axially to extend from or retract into the actuator housing 4 as shown by the arrows in FIG. 1. The TRA is also provided with flanges 5 for attachment to the structure of the helicopter. The other end 31 of the axially movable control rod 3 is connected to the tail rotor assembly 20 which comprises the rotor blades (not shown) attached to a linkage 22 (sometimes referred to as a spider) mounted to a swash plate 24. The swash plate 24 is installed to the end 31 of the axially moveable control rod 3 via a duplex bearing 35 and secured by a nut 36. The rotor rotates as indicated by the arrow in FIG. 1 which also causes rotation of the swash plate 24 to which the rotor blades are attached. The pitch of the blades is adjusted by axial movement of the control rod 3 which causes corresponding axial movement of the swash plate 24 and the linkage 22, with acts on the blades to vary their pitch. The bearing 35 provides rotational decoupling between the swash plate and the end 31 of the control rod, the swash plate rotating around the outer race of the bearing, where the control rod is mounted on the inner race of the bearing. Thus the transfer of torque from rotation of the rotor to the control rod 3 (and, therefore, back to the TRA) is prevented or minimised by the bearing 35.

As mentioned above, the TRA may be designed to accept a small amount of transmitted torque to allow for some wear of the bearing, but will be damaged by excessive torque. The state of the bearing therefore needs to be carefully and accurately monitored.

Figure 3:
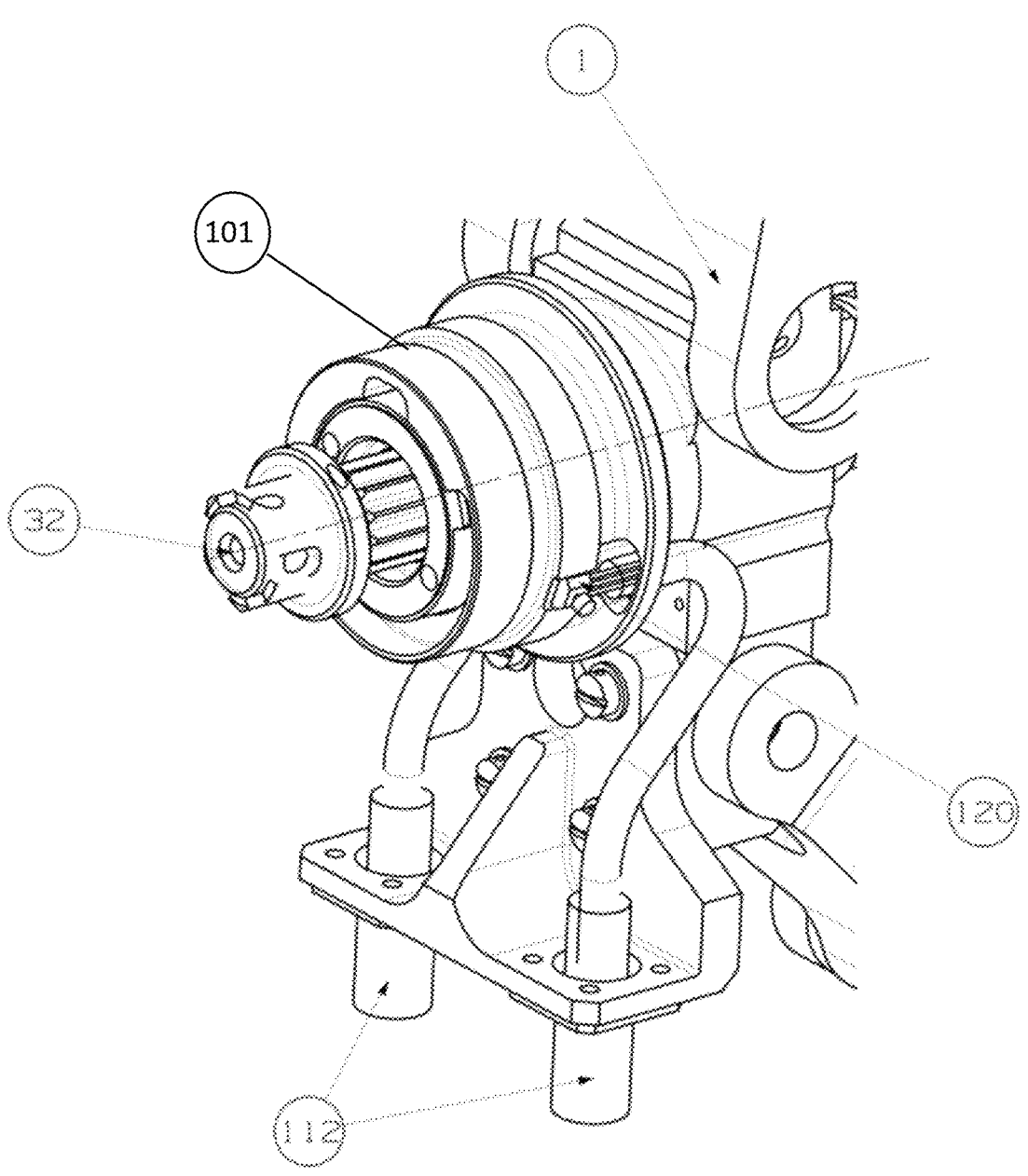
FIG. 3 shows an enclosed view of the bearing monitoring assembly according to the disclosure.

The solution provided by the present disclosure is to detect an increase in torque on the control rod 3 directly using a compact bearing monitoring assembly 100 located at the end 32 of the rod where it is connected to the lever 1. The assembly uses a torsional spring and sensors such as Hall sensors to directly measure when increased torque is provided on the control rod 3. FIG. 3 shows the tail rotor control assembly to which the bearing monitoring assembly 100 can be applied. The remainder of the tail rotor control assembly is substantially as described above with reference to FIG. 1.

Figure 4:
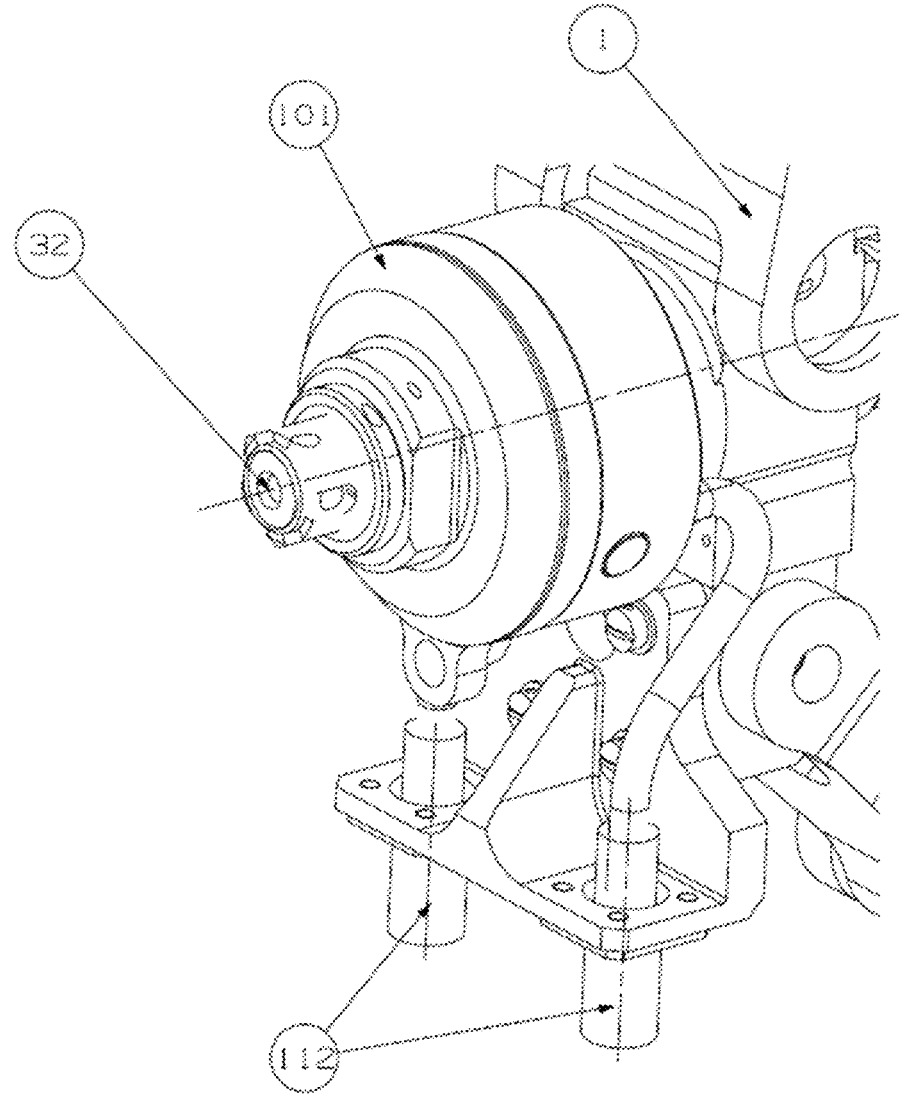
FIG. 4 shows the assembly of FIG. 3 with the cover removed for ease of explanation.

FIG. 3 shows the bearing monitoring assembly 100 in more detail where it is mounted to the end 32 of the control rod 3. In use, a cover 101 is provided over the parts of the assembly as shown in FIG. 3. In FIG. 4, the cover 101 has been removed for ease of explanation and FIG. 5 shows the assembly 100 in cross-section, again, for ease of explanation.

Figure 5:
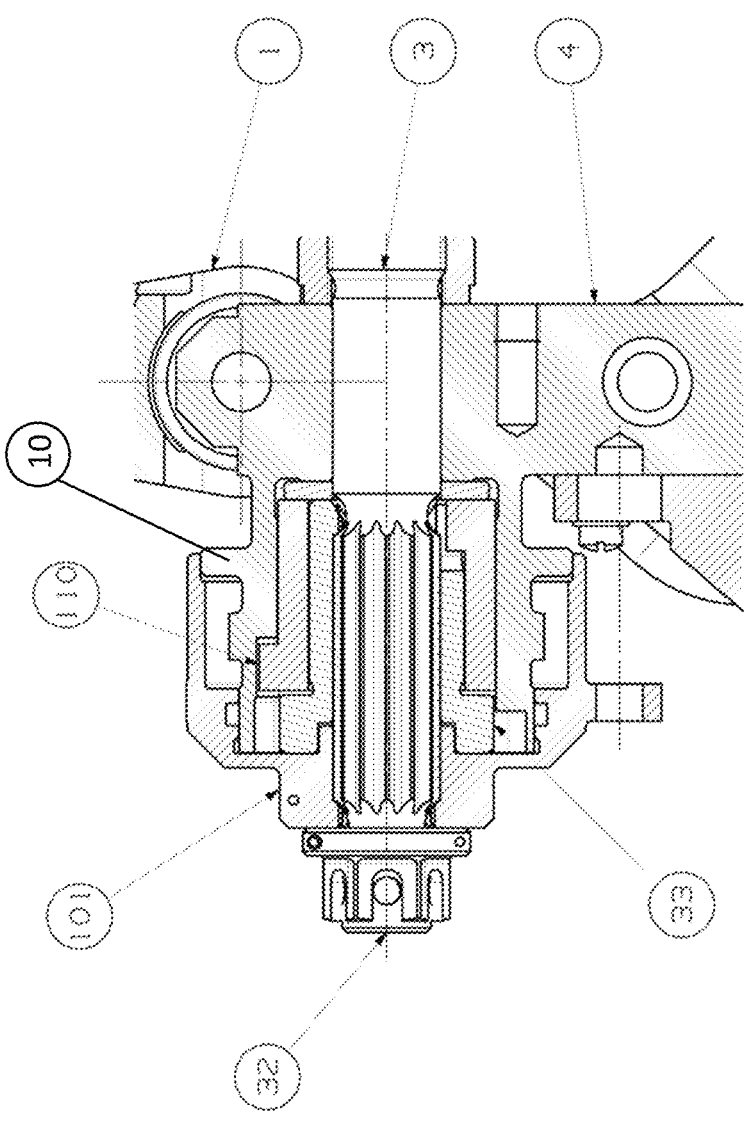
FIG. 5 is a cross-section through an assembly as shown in FIGS. 3 and 4.

As best seen in FIG. 5, the bearing monitoring assembly 100 includes a torsional spring 110 mounted within the TRA around the control rod 3 via a bushing 33. Sensors—here Hall sensors 120, but other sensors for measuring rotation could also be used—are provided on the housing adjacent the torsional spring 110 and are powered via connectors 112.

The trunnion 4 has the function of connecting the control rod 3 to the input lever 1, providing the mechanical feedback of the position of the control rod. Pre-load applied to a nut at the end 32 of the control rod compresses the trunnion 4 against the control rod 3 through the bushing and cover 101. This ensures that there is no play between the trunnion and the control rod 3 which might affect mechanical feedback. This installation does not introduce constraints on rotation between the control rod 3 and the trunnion 4 and so the control rod is free to rotate with respect to the trunnion in the case of application of torque at end 31 of the control rod. Any rotation between the two parts is transmitted through the spring 11 located between them.

The torsional spring 110 is pre-loaded such that in normal operation, or rather below a certain torque value transmitted by the duplex bearing 35 to the pitch control rod 3, no rotation of the pitch control rod 3 occurs with respect to the trunnion 4.

As the torque applied to the control rod 3 via the bearing 35 increases beyond the pre-load, the torsional spring 110 is twisted by the torque transmitted to the torsional spring from the control rod 3. The spring undergoes a torsion proportional to the applied torque. The torsion of the spring results in a small relative rotation of the pitch control rod 3 with respect to the trunnion 4; the rotation is detected by the Hall sensors 120. The correlation between torque and rotation on the spring 110 can be controlled by changing the spring stiffness.

Twist of the spring 110 and relative angular displacement of the pitch control rod 3, as detected by the sensors, by more than a predetermined threshold value, indicates a torque level of concern and can cause generation or activation of an alarm or alert. In some cases, multiple levels of detected torque can trigger different alarms or alerts indicating different degrees of urgency for replacement of the bearing. The levels of torque that trigger the alarms/alerts can be varied according to customer requirements.

By measuring torque directly, the bearing monitoring assembly 100 has improved accuracy compared to temperature measurement. Moreover, the bearing monitoring assembly 100 allows for a reduction in occurrence of maintenance inspections conducted by qualified personnel therefore, reducing the downtime and reducing operating costs The assembly comprises a small number of simple and readily available parts than can be mounted together in a protected area of the system rather than in the rotor area, thus making the assembly easier to assemble and maintain and less prone to failure. The detection and alert levels are easily adaptable to satisfy customer requirements.

Although described in relation to a helicopter rotor assembly, it is feasible that the monitoring assembly of the disclosure could be beneficial in other applications for monitoring the health of a bearing in a rotary system.

The invention claimed is:

1. An actuator assembly comprising:
   an actuator housing;
   an assembly for monitoring torque applied to a control rod of an actuator, the control rod mounted within and rotational relative to a housing, the assembly comprising:
   a torsional spring located between the control rod and the housing; and
   one or more sensors for monitoring angular displacement of the control rod relative to the housing as consequence of torque applied to the control rod transmitted through the torsional spring;

wherein the assembly is mounted within the actuator housing, the control rod is arranged to move axially within and relative to the actuator housing, the control rod having a first end within the actuator housing and a second end extendible out of the actuator housing when the control rod moves relative to the actuator housing, the torsional spring provided at the first end of the control rod.

2. The actuator assembly of claim 1, wherein the one or more sensors comprise hall sensors.

3. The actuator assembly of claim 2, wherein the Hall sensors are provided on the housing.

4. The actuator assembly of claim 1, wherein the torsional spring is pre-loaded such that the torque is only transmitted to cause rotation of the control rod when the applied torque exceeds the pre-load.

5. The actuator assembly of claim 1, the assembly for monitoring further comprising:
a cover over the parts of the assembly.

6. The actuator assembly of claim 1, further comprising:
wherein when the sensors are configured to sense rotation of the control rod more than a first predetermined degree of rotation.

7. The actuator assembly of claim 6, the assembly for monitoring further comprising:
a first alarm configured to be activated in the event that the sensors sense rotation of the control rod more than the first predetermined degree of rotation.

8. The actuator assembly of claim 6,
wherein the sensors are configured to sense rotation of the control rod more than a second predetermined degree of rotation.

9. The actuator assembly of claim 8, the assembly for monitoring further comprising:
a second alarm configured to be activated in the event that the sensors sense rotation of the control rod more than the second predetermined degree of rotation.

10. The actuator assembly of claim 1, being a helicopter tail rotor actuator.

11. An actuator assembly as claimed in claim 10, further comprising:
a bearing at the second end of the control rod.

12. The actuator assembly of claim 11, further comprising:
a swash plate connected to the control rod via the bearing.

13. The actuator assembly of claim 12, further comprising:
a lever mechanism in engagement with the swash plate for controlling the pitch of blades of the helicopter responsive to movement of the swash plate.

14. The actuator assembly of claim 10, further comprising:
a lever connected to the first end of the control rod for transferring axial motion to the control rod.

* * * * *